Aug. 25, 1970   A. H. DE ROOIJ ET AL   3,525,585
PROCESS OF PREPARING WATER-SOLUBLE PHOSPHATES
Original Filed March 18, 1965
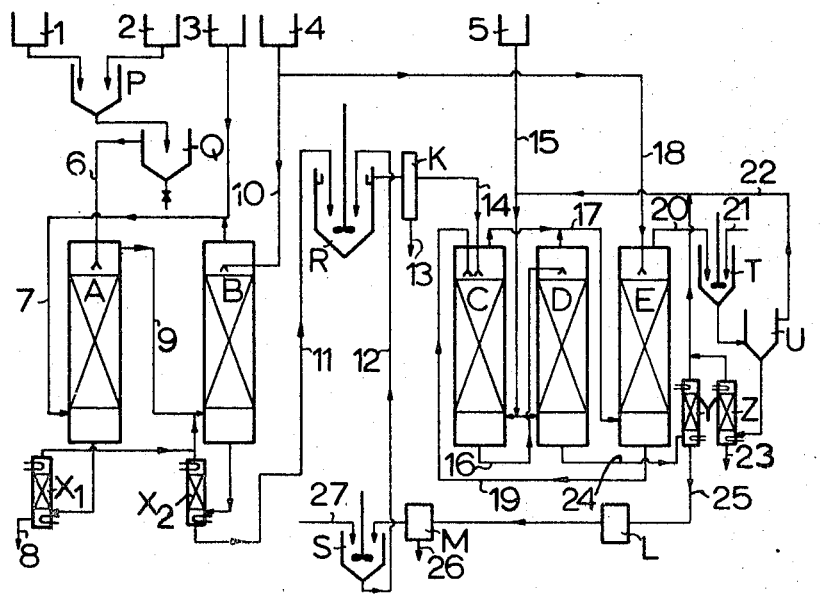
INVENTORS
*Abraham H. de Rooij*
*Jan Elmendorp*
BY *Cushman, Darby & Cushman*
ATTORNEYS United States Patent Office 3,525,585
Patented Aug. 25, 1970

3,525,585
PROCESS OF PREPARING WATER-SOLUBLE
PHOSPHATES
Abraham H. de Rooij, Geleen, and Jan Elmendorp,
Brunssum, Netherlands, assignors to Stamicarbon N.V.,
Heerlen, Netherlands
Original application Mar. 18, 1965, Ser. No. 440,789, now
Patent No. 3,446,583. Divided and this application
Jan. 19, 1968, Ser. No. 724,647
Claims priority, application Netherlands, Mar. 21, 1964,
6403053
Int. Cl. C01b 25/28, 25/30
U.S. Cl. 23—106
7 Claims

ABSTRACT OF THE DISCLOSURE

A process for preparing a water-soluble ammonium or alkali phosphate which includes decomposing phosphate rock with excess nitric acid, extracting the resulting decomposition liquor containing calcium nitrate, phosphoric acid and nitric acid with a polar organic solvent which is poorly miscible with water to form an aqueous solution phase containing mainly calcium nitrate and an organic solvent phase of phosphoric acid, nitric acid and some calcium nitrate, extracting the organic phase with water to remove substantially the dissolved components therefrom, and to form an aqueous solution containing phosphoric acid, nitric acid and calcium nitrate, adding ammonium or alkali sulphate to this aqueous solution and separating the resulting gypsum therefrom and subsequently extracting the aqueous solution with a polar organic solvent which is poorly miscible with water to form an organic solution containing nitric acid and a solution containing mainly primary alkali or ammonium phosphate.

This application is a division of application, Ser. No. 440,789, filed Mar. 18, 1965, now Pat. No. 3,446,583.

The present invention relates to the preparation of water-soluble phosphates.

Water-soluble phosphates, such as the mono-, di-, and tri-alkali phosphates and primary calcium phosphate, have usually been prepared by adding an alkali metal carbonate or milk of lime to phosphoric acid after which the desired phosphate is obtained by evaporation and crystallization. The phosphoric acid needed for such process has been obtained either by a thermal method involving the combustion of phosphorus to give the pure acid or by wet decomposition of phosphate rock with sulfuric acid, the latter involving a less pure acid which must first be subjected to a special purification treatment before use in the manner indicated.

Both phosphoric acid and alkali carbonates are relatively expensive starting materials for the preparation of water-soluble phosphates. Hence, an important object of the present invention is to provide a process for preparing in processes according to the invention water-soluble phosphates using much cheaper materials, namely, phosphate rock, nitric acid, and in some cases alkali sulphate. Other objects will also be hereinafter apparent.

A process according to the invention for preparing a water-soluble calcium phosphate comprises the following steps: decomposing phosphate rock with excess nitric acid, extracting resulting decomposition liquor containing calcium nitrate, phosphoric acid and nitric acid with a polar organic solvent which is poorly miscible with water so as to take up most of the acids in such solvent and to leave most of the nitrate in the aqueous phase, extracting the organic phase with water so as substantially to remove dissolved components therefrom and subsequently extracting the resulting aqueous solution with a polar organic solvent which is poorly miscible with water and preferentially dissolves nitric acid from such aqueous solution so that nitrate dissolved in the aqueous phase is converted with the phosphoric acid contained therein to form soluble calcium phosphate.

A primary alkali phosphate can be prepared by a similar process, the only additional steps required being the addition of an alkali sulphate to the aqueous solution of acids resulting from the extraction with water of the organic phase obtained by the first extraction step, and the separation of the precipitated gypsum. In that case the subsequent preferential removal of the nitric acid from the acid solution results in the conversion of dissolved nitrate to the required primary alkali phosphate.

Where reference is made herein to a primary alkali phosphate and to alkali sulphate, the term "alkali" is to be understood as including "ammonium."

Preparatory to the extraction of the aqueous solution of acids by means of an organic solvent which preferentially dissolves the nitric acid, the molar $CaO/P_2O_3$ ratio of this solution should be in the region of $1:1$. The ratio may be reduced to this value during the preceding part of the process by the extraction of the decomposition liquor with the polar solvent. If necessary or desired however some calcium nitrate may be removed from the decomposition liquor by crystallisation before this liquor is extracted with the polar solvent. If the aqueous solution of acids resulting from the extraction with water proves to have a $CaO/P_2O_5$ molar ratio of less than $1:1$ the ratio can be brought to the appropriate value by adding further calcium in the form of calcium nitrate, calcium oxide, calcium hydroxide or calcium carbonate.

Phosphate rock can be decomposed with an excess of nitric acid having a concentration of 45–65% by weight. The resulting decomposition liquid contains calcium nitrate, phosphoric acid, and the excess nitric acid. This solution may be extracted either with or without first partially removing calcium nitrate by crystallization, and the extraction may e.g. be effected with certain alcohols, ethers and ketones, poorly miscible with water, preferably an aliphatic alcohol with 4 to 6 carbon atoms. This extraction gives, on the one hand, an aqueous phase consisting mainly of calcium nitrate, and, on the other hand, an organic solvent phase which includes phosphoric acid, nitric acid and an amount of calcium nitrate.

The extraction of the aqueous solution of acids for preferentially dissolving nitric acid may be effected with a polar organic solvent which has a low mutual miscibility with water and preferentially dissolves nitric acid from a solution containing nitric acid and phosphoric acid. Typically suitable solvents for this purpose are, for example, aliphatic ketones and ethers. This extraction gives, on the one hand, a solution containing mainly primary phosphate, and, on the other, the organic solvent containing nitric acid.

The eventually resulting solution containing primary phosphate and referred to above can be subjected to evaporation and then cooled in order to crystallize primary phosphate crystallizes and after this has been separated from the mother liquor the latter can be recycled to the extraction stage working with the organic solvent which preferentially dissolves nitric acid.

The organic solvent containing the nitric acid preferentially dissolved from the aqueous solution of acids can be neutralized so as to separate out a nitrate-containing aqueous layer, and the organic solvent freed of this nitric acid, can be recycled to the extraction stage.

Any primary alkali phosphate produced by a process according to the invention converted to secondary or tertiary phosphate in conventional fashion by dissolving it, adding the required amount of alkali carbonate or alkali carbonate plus alkali hydroxide, and evaporating the resulting solution to dryness, preferably after filtration of any aluminum hydroxide and ferric hydroxide, that may have separated out.

In the preparation of pure alkali phosphates from phosphate rock, nitric acid and alkali sulphate, the removal of the impurities, such as compounds of fluorine, iron and aluminum, contained in the phosphate rock, is of great importance. In the present process, these substances are for the greater part removed in the first stage, viz during the first extraction of the solution containing nitric acid, phosphoric acid, and calcium nitrate. The impurities are removed at that stage together with a large portion of the calcium nitrate, in the form of an aqueous solution which can be processed into calcium nitrate fertilizer.

Compounds of iron and aluminum that are still retained in the organic extraction agent and taken along by it are partly adsorbed at a later stage by the gypsum that is precipitated, so that ultimately a virtually pure primary alkali phosphate can be obtained.

The present process has the advantage that it is not necessary to start from phosphoric acid. Instead, use is made of the liquid composition which is obtained by dissolving phosphate rock in an excess amount of nitric acid having a concentration of e.g. 45–65% by weight, so as to form a solution containing calcium nitrate, phosphoric acid and the excess of nitric acid. It is not necessary to separate all of the calcium nitrate as such from this rather concentrated solution by extraction or crystallization plus extraction. Thus, it is sufficient to separate out only about 75% of it, that is to say, so much that a solution with a molar $CaO/P_2O_5$ ratio of about 1:1 is obtained. If primary alkali phosphate is being prepared, the calcium nitrate that has remained in solution is subsequently converted into gypsum and alkali nitrate by means of alkali sulphate after which the gypsum is removed by filtration. An essential step of the process is the conversion of the dissolved nitrate with phosphoric acid to form phosphate and nitric acid, by removing nitric acid from the solution by means of an extraction agent which preferentially dissolves nitric acid, and thus promotes the said conversion.

Both in the extraction of $Ca(NO_3)_2$ from the nitric decomposition liquid and in the extraction of nitric acid, the proportions of aqueous solution to be subjected to extraction and the extraction agent may be varied within wide limits. Preferably, however, a volumetric ratio of 1:1 to 1:3 is used since this insures a good extraction without the use of particularly large amounts of extraction agent.

One way of carrying out the present process is illustrated by the accompanying flow sheet wherein reference letters A, B, C, D and E denote extraction columns. These columns may be either filled with packing bodies or provided with plates and preferably the liquids in the columns are subjected to pulsation. Reaction and settling tanks are denoted by letters P, Q, R, S, T and U, while the letters $X_1$, $X_2$, Y and Z represent stripping columns. Other elements shown in the drawing include a filter K, an evaporator L, and a crystallizer M, in addition to the extraction columns.

When the process is carried out using the system shown in the drawing, nitric acid and phosphate rock are supplied to decomposition reactor P from tanks 1 and 2, respectively, for example, in such a ratio that the phosphate rock is dissolved in accordance with the equation:

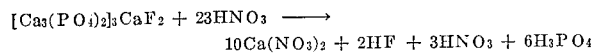
$$[Ca_3(PO_4)_2]_3CaF_2 + 23HNO_3 \longrightarrow$$
$$10Ca(NO_3)_2 + 2HF + 3HNO_3 + 6H_3PO_4$$

The resulting solution flows to a settling tank Q. All non-dissolved components settle in this tank and are periodically or continuously removed. The remaining solution of calcium nitrate and acids is fed into the top of an extraction column A through conduit 6 and is there extracted with an extraction agent, e.g., butyl- or amyl-alcohol, supplied through conduit 7 and flowing through the column in counter-current relation to the solution. At the bottom of the column A an aqueous solution is discharged which mainly contains calcium nitrate, but also includes nitric acid, phosphoric acid, and dissolved impurities, such as compounds of fluorine, iron and aluminum. This solution goes to the stripping column $X_1$ where it is freed from any extraction agent that has dissolved in it. The extraction agent thus obtained is recycled, and the calcium nitrate solution that has been stripped off is discharged through conduit 8 to be processed to the nitrogen fertilizer calcium nitrate in an installation not shown in the drawing.

If necessary, additional extraction agent is supplied from tank 3. The solution discharged from the top of extraction column A, which solution contains mainly phosphoric acid and, in addition, nitric acid and about ¼ of the calcium nitrate originally present in the extraction agent, is sent through conduit 9 into the bottom part of the extraction column B and there washed in counter-current with water supplied through conduit 10 from tank 4. In this washing operation, the dissolved phosphoric acid and calcium nitrate are taken up virtually completely by the water, and the nitric acid is taken up for the most part, while the extraction agent issuing from the top of column B is recycled through conduit 7 to column A.

The aqueous solution of phosphoric acid, nitric acid and calcium nitrate coming from the bottom of column B is freed of entrained extraction agent in stripping column $X_2$ and subsequently passed into reaction vessel R through conduit 11. If the molar $CaO/P_2O_5$ ratio in the solution is smaller than 1, it is corrected to this value by the addition of some calcium nitrate. In the case where a primary alkali phosphate is being prepared, reaction vessel R in addition receives, through conduit 12, a solution of an alkali sulphate, e.g., sodium sulphate, in such an amount that all the dissolved calcium present is converted to gypsum.

The use of a small excess of sodium sulphate with respect to the amount of calcium has no harmful effect. The resulting suspension of gypsum and a solution of sodium nitrate, phosphoric acid and nitric acid are separated in a filter K, the resulting gypsum is discharged through conduit 13 and the solution freed of gypsum is passed into the top of the extraction column C through conduit 14. The solution is here washed in counter-current with an extraction agent supplied from tank 5 through conduit 15 which preferentially dissolves nitric acid. Preferably, this extraction agent is methyl isobutyl ketone, the free nitric acid being mainly taken up by the extraction agent.

The solution of nitrate and phosphoric acid issuing at the bottom of column C is passed through conduit 16 and into the top of a following extraction column D, and there washed in counter-current with a fresh amount of extraction agent supplied through conduit 15. This amount of extraction agent is such that the nitrate is converted with phosphoric acid to primary phosphate and nitric acid, the resulting nitric acid being taken up by the extraction agent. The streams of extraction agent mainly containing nitric acid which issue from the tops of columns C and D are joined together and passed through conduit 17 into the bottom part of column E, then washed in counter-current with water supplied through conduit 18, in which process the extraction agent is freed of salts and phosphoric acid also present in it. The aqueous solution obtained from the bottom of column E is recycled through conduit 19. The extraction agent containing nitric acid which issues from the top of column E is passed through conduit 20 and into a neutralization vessel T, where it is neutralized with ammonia water supplied through conduit 21. The resulting mixture is sent to a separator vessel U, in which two layers are formed, viz a bottom layer consisting of an ammonium nitrate solution and a top layer of extraction agent. The extraction agent is recycled through conduit 22. The ammonium nitrate solution is sent to a stripping column Z to be freed of dissolved extraction agent, and thereafter removed through conduit 23.

The solution of, mainly, primary phosphate obtained from the bottom part of column D is passed through conduit 24 and into stripping column Y, where it is freed of dissolved extraction agent, and is then passed through conduit 25 and evaporator L to be concentrated. The concentrated solution is fed to a crystallizer M, and the resulting crystals of the primary alkali phosphate, or primary calcium phosphate, as the case may be, are discharged through conduit 26. Should the object of the process be the production of a primary alkali phosphate, the remaining mother liquor is sent to the dissolving tank S, to be used as dissolving agent for alkali sulphate supplied through conduit 27, after which the resulting solution is sent to reaction vessel R through conduit 12.

It will be appreciated that various modifications may be made in the invention as described above. It is possible, for instance, to replace columns C and D by one larger column, or the water to be recycled may be sent through conduit 19 to reaction vessel R.

Instead of sodium sulphate, other alkali sulphates such as potassium-, lithium-, or ammonium-sulphate may be used. In this event, the products ultimately made are primary potassium, lithium, or ammonium sulphate, respectively.

The invention is further illustrated by the following example:

From tanks 1 and 2, 810 kg. of 55% by weight nitric acid and 372 kg. of kola-phosphate are fed to the decomposition reactor P. This results in the formation of 1170 kg. of a solution having the composition:

|  | Kg. |
|---|---|
| $Ca(NO_3)_2$ | 548 |
| $HNO_3$ | 30 |
| $H_3PO_4$ | 199.5 |
| $H_2SiF_6$ and HF | 15.3 |
| $H_2O$ | 348 |
| Impurities | 29 |

In extraction column A this solution is extracted in counter-current with 3415 kg. of "butanol" having the composition:

|  | Kg. |
|---|---|
| Butanol | 2420 |
| $H_2O$ | 852 |
| $HNO_3$ | 85 |
| $H_3PO_4$ | 58 |
| $H_2SiF_6$ | 0.4 |

This gives 3155 kg. of butanol extract of the composition:

|  | Kg. |
|---|---|
| Butanol | 2405 |
| $H_2O$ | 244 |
| $Ca(NO_3)_2$ | 137 |
| $HNO_3$ | 112 |
| $H_3PO_4$ | 256 |
| $H_2SiF_6$ | 1.16 | and 1430 kg. of calcium nitrate solution of the composition:

|  | Kg. |
|---|---|
| $Ca(NO_3)_2$ | 411 |
| $HNO_3$ | 3 |
| $H_3PO_4$ | 1.5 |
| $H_2SiF_6$ | 14.5 |
| $H_2O$ | 956 |
| Impurities | 29 |
| Butanol | 15 |

This calcium nitrate is treated in stripping column $X_1$, where 15 kg. of butanol and 30 kg. of $H_2O$ are stripped off. The remaining solution is discharged.

In column B the butanol extract is treated in counter-current with a total amount of 1312 kg. of water in which is dissolved 44 kg. of butanol coming from stripping columns $X_1$ and $X_2$. The butanol treated in this way (3415 kg.) is recycled to column A. The aqueous solution discharged from the bottom of column B (1052 kg.) has the following composition:

|  | Kg. |
|---|---|
| $Ca(NO_3)_2$ | 137 |
| $HNO_3$ | 27 |
| $H_3PO_4$ | 198 |
| $H_2O$ | 660 |
| Butanol | 29 |

By stripping in stripping column $X_2$, the 29 kg. of butanol and 58 kg. of water are removed, after which 35 kg. of $Ca(NO_3)_2 \cdot 4H_2O$ are added to the solution and this solution is mixed in reaction vessel R with a sodium sulphate solution (690 kg.) having the composition:

|  | Kg. |
|---|---|
| $Na_2SO_4$ | 160 |
| $NaNO_3$ | 48 |
| $NaH_2PO_4$ | 197 |
| $H_2O$ | 285 |

After removal of the resulting gypsum, 1516 kg. of solution of the composition:

|  | Kg. |
|---|---|
| $Na_2SO_4$ | 17 |
| $NaNO_3$ | 220 |
| $NaH_2PO_4$ | 197 |
| $HNO_3$ | 27 |
| $H_3PO_4$ | 198 |
| $H_2O$ | 856 | together with solution recycled through conduit 19 (90 kg. of water, with, in addition, 2 kg. of $NaNO_3$, 13 kg. of $HNO_3$, 8 kg. of $H_3PO_4$, 0.14 kg. of $H_2SiF_6$, and 5 kg. of methyl isobutyl ketone), are extracted in column C in counter-current with 2645 kg. of aqueous methyl isobutyl ketone (2600 kg. of methyl isobutyl ketone, the remainder being water).

The extracted solution, 1551 kg. having the composition:

|  | Kg. |
|---|---|
| $Na_2SO_4$ | 17 |
| $NaNO_3$ | 136 |
| $NaH_2PO_4$ | 317 |
| $H_2SO_4$ | 104 |
| $H_2O$ | 941 |
| Methyl isobutyl ketone | 35 | is again extracted, in column D, with 2645 kg. of aqueous methyl isobutyl ketone, resulting in the formation of a solution mainly containing primary sodium phosphate and having the composition:

|  | Kg. |
|---|---|
| $Na_2SO_4$ | 17 |
| $NaNO_3$ | 48 |
| $NaH_2PO_4$ | 440 |
| $H_2O$ | 936 |
| Methyl isobutyl ketone | 35 |

The last-mentioned solution is freed of entrained methyl isobutyl ketone in stripping column Y. The solution is fed to evaporator L, where 463 kg. of water are evaporated.

After cooling in the crystallizer M, 316 kg. of $NaH_2PO_4 \cdot 2H_2O$ are obtained containing as contaminating matter only 0.03% F and 0.01% iron and aluminum, calculated as oxide. The remaining mother liquor, 547 kg. has the following composition:

|  | Kg. |
|---|---|
| $Na_2SO_4$ | 17 |
| $NaNO_3$ | 48 |
| $NaH_2PO_4$ | 197 |
| $H_2O$ | 285 |

In this mother liquor there is dissolved, in stirred vessel S, 143 kg. of $Na_2SO_4$, after which the resulting solution is fed to reaction vessel R, with the purpose of again precipitating gypsum from the calcium nitrate-containing solution supplied through conduit 11.

The methyl isobutyl ketone discharged from the tops of columns C and D, which contains nitric acid, is washed in column E with 110 kg. of water, as a result of which dissolved salts are removed from the methyl isobutyl ketone.

The methyl isobutyl ketone, which contains nitric acid, is now neutralized with 22% by weight ammonia water in neutralization vessel T. Thereafter, the resulting ammonium nitrate solution (total weight: 378 kg., comprising 196 kg. of $NH_4NO_3$, 177 kg. of water, 5 kg. of methyl isobutyl ketone) is separated from the methyl isobutyl ketone in separator U, and is freed of the entrained methyl isobutyl ketone in stripping column Z.

The layer of methyl isobutyl ketone formed in separator U, 5250 kg. (of which 90 kg. is water) is recycled to columns C and D through conduit 22.

The scope of the invention is defined in the following claims wherein:

What is claimed is:

1. A process for producing from phosphate rock a water-soluble member selected from the group consisting of alkali metal phosphate and ammonium phosphate comprising
    (1) decomposing said phosphate rock with an aqueous solution of nitric acid in stoichiometric excess amount to form an aqueous solution containing calcium nitrate, phosphoric acid and nitric acid,
    (2) separating the acid values of said aqueous solution by extracting said acid values with a polar organic by extracting said acid values with polar organic solvent having limited miscibility with water, the volume ratio of polar organic solvent to aqueous solution being by volume at least 1:1 thereby leaving the major amount of calcium nitrate in the aqueous phase,
    (3) washing the polar organic phase with an aqueous medium to regenerate said polar organic solvent, thereby producing a substantially acid-free polar organic solvent phase and an acid-containing aqueous phase containing phosphoric acid, nitric acid and a minor amount of calcium nitrate,
    (4) adding to the acid containing aqueous phase a member selected from the group consisting of alkali metal or ammonium sulphate in at least stoichiometric amount with respect to calcium present in said aqueous phase and separating the resulting gypsum from the acid containing aqueous phase,
    (5) separating nitric acid values of said acid containing aqueous phase by extracting the nitric acid values with a polar organic solvent having limited miscibility with water, and preferentially dissolving nitric acid from a solution containing nitric acid and phosphorc acid, the volume ratio of polar organic solvent to acid-containing aqueous phase being by volume at least 1:1 thereby leaving an aqueous solution containing mainly primary alkali metal or ammonium phosphate.

2. The process of claim 1 which includes cooling the aquous solution resulting from decomposing said phosphate rock in (1) sufficiently to produce calcium nitrate crystals, separating the calcium nitrate crystals from the remaining aqueous solution and continuing treating the remaining aqueous soltuion as step (2).

3. The process of claim 1 wherein the polar organic solvent in step (2) is an aliphatic alcohol having 4–6 carbon atoms.

4. The process of claim 3 which includes recycling the substantially acid-free polar organic phase produced in step (3) to step (2).

5. The process of claim 1 which includes adding to the acid-containing aqueous phase produced in step (3) an amount of calcium in the form of a calcium compound selected from the group consisting of calcium nitrate, calcium oxide, calcium hydroxide and calcium carbonate such that the molar $CaO/P_2O_5$ ratio in said acid-containing aqueous phase has a value of 1:1.

6. The process of claim 1 wherein the polar organic solvent in step (4) is methylisobutylketone.

7. The process of claim 1 which comprises the further steps
    (6) evaporating water from the aqueous solution containing primary alkali-metal or ammonium phosphate to produce a concentrated solution of primary alkali-metal or ammonium phosphate,
    (7) cooling said concentrated solution of primary alkali-metal or ammonium phosphate to produce primary alkali-metal or ammonium phosphate crystals,
    (8) separating said primary alkali-metal or ammonium phosphate crystals from the mother liquor,
    (9) recycling said mother liquor to nitric acid values separating step (5),
    (10) neutralizing the separated acid values in said polar organic solvent from step (5) with an aqueous solution of ammonium nitrate,
    (11) removing said aqueous solution of ammonium nitrate from the neutralization zone to provide a substantially nitric acid-free polar organic solvent, and
    (12) recycling said substantially nitric acid-free polar organic solvent to step (5) above.

References Cited

UNITED STATES PATENTS

| | | | |
|---|---|---|---|
| 2,885,265 | 5/1959 | Cunningham | 23—165 |
| 3,245,777 | 4/1966 | Chang | 71—39 |
| 3,298,782 | 1/1967 | Archambault | 23—165 |

FOREIGN PATENTS 672,008  10/1963  Canada.

OSCAR R. VERTIZ, Primary Examiner

G. A. HELLER, Assistant Examiner

U.S. Cl. X.R.

23—107; 71—39, 43